June 30, 1942.   W. C. BUCKLEY   2,287,863
LEVEL
Filed June 5, 1941
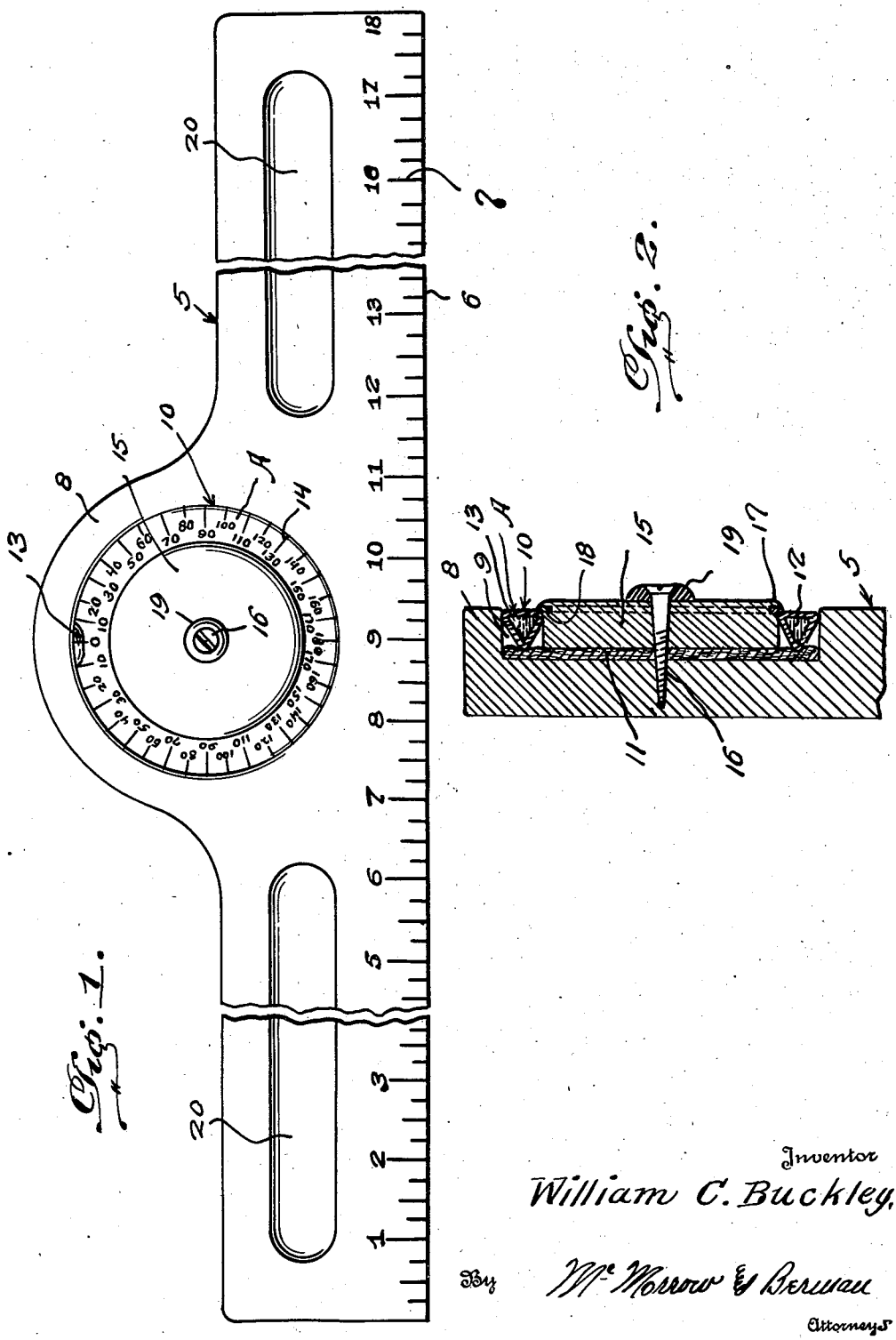
Inventor
William C. Buckley,
By McMorrow & Berman
Attorneys Patented June 30, 1942

2,287,863

UNITED STATES PATENT OFFICE 2,287,863

LEVEL

William C. Buckley, Reynolds, N. Dak.

Application June 5, 1941, Serial No. 396,758

2 Claims. (Cl. 33—213)

This invention relates to levels, and has for the primary object the provision of a device of the above stated character which will be economical to manufacture, compact and durable and which will not only be serviceable in determining the level of perpendicular and plane surfaces but will accurately register the inclination of a surface and may be conveniently read from any position of use.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawing, in which—

Figure 1 is a side elevation illustrating a level constructed in accordance with my invention.

Figure 2 is a fragmentary transverse sectional view showing the mounting of the spirit level tube.

Referring in detail to the drawing, the numeral 5 indicates an elongated body having a straight edge 6 provided with a ruler scale, as indicated at 7. The medial portion of the body 5 is enlarged, as shown at 8, and has formed in one face thereof a recess 9 for the reception of an annular spirit tube 10 constructed of glass, transparent plastic or any other material suitable for the purpose and is preferably of triangular shape in cross section having the apex thereof disposed innermost within the recess and seated against a cushion disc 11 lying against the inner wall of the recess 9.

The tube 10 has a liquid 12 therein providing a bubble 13. The wall A of the tube may have applied thereon, in any suitable manner, a scale 14 reading from zero to 180 degrees in either direction from the zero, as clearly shown in Figure 1. The tube 10 abuts the annular wall of the recess and is wedged thereagainst by a disc-like retaining member 15 secured to the body 5 by screw or like fasteners 16.

A marginal flange 17 is provided on the member 15 to partly overlie the tube 10 and it is preferable that a cushion gasket 18 be arranged between the flange and the tube to assure against breakage of the tube. Further the tube seating against the cushion disc 11 is protected against breakage.

A cushion gasket 19 is arranged between the head of the screw 16 and the member 15 with the head of the screw countersunk therein.

With the tube mounted in the medial portion 8 of the body 5 it is easily readable from any position that the body 5 may be placed in. Also, it is to be understood that the scale 14 may be applied to the portion 8 instead of the tube if desired. The body 5 may be constructed of any material suitable for the purpose, such as wood, metal, plastic material or the like.

The faces of the body 5 may be recessed, as shown at 20, to facilitate a person obtaining a firm grip on the body besides reducing the weight of the body.

The tube 10 being of the cross sectional shape as specified, will permit concentrating the air space therein to a more definite size and it is to be understood that the liquid in said tube may be of any selected color, preferably of a color which will be readily distinguishable from the color of the scale on the tube.

The level of the construction heretofore described in detail and shown in the drawing, will permit the plumb to always be directly visible regardless of what position the level occupies with the addition of having the exact plumb and reading in degrees instantly with no bother of adjustment such as tightening nuts, wearing of parts or deteriorating of material.

A device of this kind can be easily adaptable in the proper size for woodworking machines, such machinery having tilting tables to indicate tapers on wood being turned. This use with many others are believed apparent from the foregoing description and the showing made in the drawing and also it will be seen that the device may be economically manufactured, will be compact, durable and extremely serviceable.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a level, an elongated body having a scale straight edge and offset at its medial portion to provide a frame part having an annular recess in one face thereof, a liquid spirit tube of annular formation seated in said recess and of transparent material, a cushion disc between said tube and the inner wall of the recess, a disc-like member positioned in the recess within the annular tube and detachably secured to the frame part and provided with a marginal flange overlying a portion of the tube, a cushion gasket arranged between the tube and the flange and cooperative with the cushion disc in supporting the tube within the recess against breakage.

2. In a level, an elongated body having a scale straight edge and an annular recess, an annular shaped liquid spirit tube seated in said recess and of triangular shape in cross section and provided with a scale in degrees thereon, a cushion disc between the inner wall of the recess and the apex of the tube, an annular member in the recess within the annular tube and abutting the cushion disc, a fastener extending through said member into the frame part of the body, a cushion gasket between the fastener and the member, a marginal flange on said member and overlying a portion of the tube, and a cushion gasket between the flange and said tube.

WILLIAM C. BUCKLEY.